March 21, 1961   M. F. ALEXANDER   2,976,065
GAS PRESSURIZED FLUID SEAL
Filed July 3, 1956
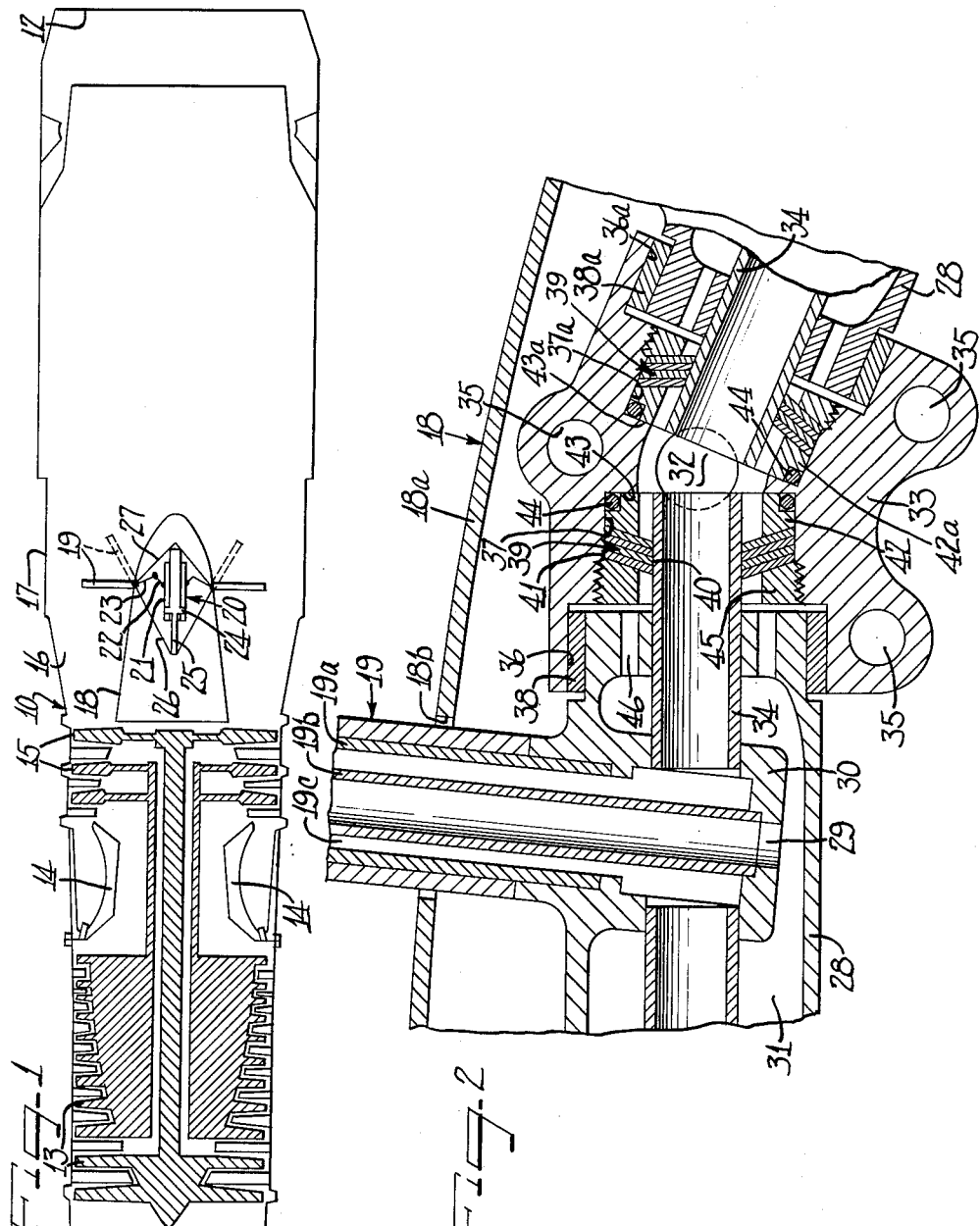
Inventor
Melville F. Alexander United States Patent Office 2,976,065
Patented Mar. 21, 1961

2,976,065
GAS PRESSURIZED FLUID SEAL

Melville F. Alexander, Euclid, Ohio, assignor to Thompson Ramo Wooldridge Inc., a corporation of Ohio Filed July 3, 1956, Ser. No. 595,772

3 Claims. (Cl. 286—8)

This invention relates generally to a seal, and more particularly to a gas pressurized fluid seal capable of preventing fluid leakage between relatively movable parts. Still more particularly, this invention relates to a rotating seal subjected to a gas and a fluid, wherein the gas pressure is higher than the fluid pressure, that prevents fluid leakage past the rotating seal.

By way of specific example, the instant invention is highly desirable for use in a jet engine equipped with an afterburner umbrella spraybar arrangement, wherein the position of the spraybars may be varied in order to vary the distribution of fuel in the afterburner chamber. Inasmuch as fuel and air are supplied to the spraybars, and the spraybars are relatively movable in the afterburner chamber, it is necessary to seal the relatively movable parts against any leakage of fuel in order to effect proper operation of the spraybar arrangement. It may also be appreciated that due to the exhaust gases in the afterburner chamber and the further igniting of fuel, the temperatures and pressures are extremely high. Heretofore, difficulty has been encountered in sealing fluid such as fuel under pressure at high temperature.

In the present invention, the fluid seal between the relatively movable parts is gas pressurized so that it only sees the differential pressure of a gas and the fluid rather than the fluid pressure itself. This arrangement is particularly advantageous when gas leakage to the fluid and enclosed atmosphere is permissible. This factor insures that there is absolutely no fluid leakage past the rotating seal when the gas pressure is higher than the fluid pressure. In effect, the present invention provides a rotating seal which avoids fuel or fluid leakage.

Accordingly, it is an object of this invention to provide a seal between relatively movable parts which is gas pressurized and capable of sealing a fluid medium of lower pressure.

Another object of this invention resides in the provision of a gas pressurized seal which seals a liquid of lower pressure to prevent any leakage whatsoever of the liquid along the seal.

A further object of this invention is in the provision of a liquid seal capable of sealing a liquid under pressure at high temperature.

A still further object of this invention is to provide a rotating seal subjected to a pressurized liquid at one side and a pressurized gas on the other side of a higher pressure, wherein leakage of the gas into the liquid is permissible but leakage of the liquid pass the seal is prevented.

Another object of this invention is to provide a gas pressurized fluid seal for use between relatively rotatable parts which includes a resilient means contacting the relatively movable parts and being subjected on one side to a fluid pressure and on the other side to a gas pressure of higher pressure, wherein leakage of the gas into the liquid and the atmosphere is permissible while any leakage of the liquid beyond the resilient member of the seal is prevented.

Other objects, features, and advantages of the invention will be apparent from the following detailed disclosure, taken in conjunction with the accompanying sheets of drawings, wherein like reference numerals refer to like parts, in which:

Figure 1 is an axial diagrammatic view, with some parts in section and other parts in elevation, of a jet engine equipped with an afterburner spraybar arrangement which utilizes the gas pressurized fluid seal of the present invention; and Figure 2 is a greatly enlarged fragmentary view of a portion of the spraybar arrangement showing relatively movable parts equipped with the gas pressurized fluid seal according to the invention.

As shown on the drawings:

Referring particularly to Figure 1, a typical jet engine 10 is illustrated which includes an intake nozzle 11 for receiving air from the atmosphere and a discharge nozzle 12 for expelling high temperature and high pressure gases generated by the engine which develop jet engine thrust. As the air passes through the engine it is compressed by multi-stage axial air flow compressors 13 which discharge high pressure compressed air into combustion chambers or cans 14. Fuel is fed to the combustion chamber 14 to mix with the compressed air and be ignited to discharge high temperature and high pressure gases into turbines 15. These gases expand through the turbines 15, the latter of which serve to drive the compressors 13, and enter an exhaust or afterburner chamber 16.

This afterburner chamber is defined by an outer shell or casing 17 of the jet engine and a tail cone 18 suitably suspended within the shell 17 thereby giving the afterburner chamber a toroidal shape. The expanding gases then are propulsion exhausted through the discharge nozzle 12 to provide thrust for the jet engine.

In order to increase the thrust forces and overall efficiency of the jet engine, additional fuel may be injected into the afterburner chamber 16 for additionally raising the pressure and temperature of the gases passing therethrough. In the instant case, a spraybar arrangement is provided, wherein a plurality of generally circumferentially spaced and radially extending spraybars 19 are pivotally mounted on the tail cone 18 in the area of the afterburner chamber 16. By varying the positions of the spraybars within the range of the spraybars shown in solid lines and those shown in dotted lines, varying degrees of fuel distribution and thrust augmentation of the jet engine may be rendered.

In order to provide control of the movement of the spraybars 19, a fluid-operated actuator 20 which is a pneumatic or air actuator in the instant case, is suitably mounted within the tail cone 18. This actuator includes a housing or cylindrical casing 21 mechanically connected to the spraybars 19 through a link 22 pivotally connected at one end to the casing 21 and pivotally connected at the other end to an actuating lever 23 which is fixed to a spraybar at its pivot point. The actuator also includes a piston 24 slidably received within the casing 21 and having a stem or rod 25 extending from opposite ends and suitably fixed at opposite ends to stationary brackets 26 and 27. Obviously, the relatively movable parts of the air actuator may be arranged so that the piston 24 is stationarily mounted and the cylinder casing 21 is movably mounted and mechanically linked to the spraybars 19.

Any suitable type of remote control mechanism may be employed for operating the air actuator 20, for example, a mechanism which is associated with the operation of the throttle lever of the jet engine.

Referring now more particularly to the spraybar system, as seen in Figure 2, the tail cone 18 includes a tail cone skin surface 18a which is circumferentially slotted at 18b to permit the spraybars 19 to move longitudinally within the afterburner chamber 16. Each spraybar 19 extends from a hollow tubular spraybar support 28 which is pivoted on an axis tangent to a circle whose circumference is normal to the center line of a jet engine, and includes an outer tube 19a and an inner air tube 19b concentric therewith. A mixing chamber 19c is defined between the outer and inner tubes 19a and 19b. The inner air tube 19b extends downwardly into the spraybar support 28 and is sealingly connected with an air passage 29 formed in a substantially cylindrical base 30 which extends into the spraybar support 28 to communicate with a large air or gas passage 31 formed in the support. Compressed air is fed to the spraybar through this passage.

Fuel is fed to the spraybar 19 through a fuel inlet 32 in a bearing support 33 which communicates with the mixing chamber 19c of the spraybar 19 through a tubular member 34. A plurality of these bearing supports 33 are circumferentially spaced within the inner surface of the tail cone skin surface 18a and suitably secured to the tail cone skin surface by bracket means (not shown) connecting to mounting holes 35 on the bearing support. Every other bearing support is provided with an air inlet for feeding air to the spraybars, which are not shown for purposes of clarity and which form no part of the instant invention. The opposite ends of each bearing support 33 are arranged to be coaxial with the axes of the adjacent spraybar housings 28. At each end of the bearing support is provided a pair of successively smaller counterbores 36 and 37, and 36a and 37a, for receiving the adjacent ends of the spraybar housings and the rotating seal of the present invention. Combination main bearings and air seals in sleeve form as indicated by the numeral 38 provide journalling for the ends of the spraybar housings 28 with respect to the stationary bearing support 33 as well as functioning to prevent air leakage. However, slight leakage is permissible and desired since the bearing is kept cooler in this manner.

The adjacent ends of the spraybar housings 28 are diametrically reduced to tightly receive the fuel conveying tubular member 34 and hold it in place for corotation therewith. This tubular member is also sealingly related to the spraybar base casing 30 so that fuel does not leak into the air chamber 31.

Heretofore, it has been very difficult to seal liquids under pressure at high temperatures. The main purpose of the present invention is to prevent leakage of the fuel at the pivotal connection between the bearing support 33 and the spraybar housings 28, since such would be clearly objectionable and undesirable. Therefore, the present invention deals with a gas pressurized liquid seal for employment between relatively movable parts.

For obvious purposes of simplicity, only one of the seal arrangements with one of the spraybar housings will be described, the other being identical but reversely positioned.

This seal includes a plurality of "Reed" seals or washers 39 received between the inner counterbore surface 37 or 37a and the adjacent end of the tubular members 34. These seals are resilient or springy in that they tend to straighten from their inclined or conically shown position so that the inside peripheries 40 intimately contact the outer surface of the liquid conveying members 34. The outer periphery of the seals 39 tend to intimately contact the counterbore 37 or 37a. These seals 39 will be made of a suitable springy metal such as stainless steel or the like.

In order to hold the seals in position, adapter rings 42 and 42a are inserted in the counterbores 37 and 37a and against the inner shoulders 43 and 43a respectively. The outer periphery of each adapter ring is annularly notched to receive a metal O-ring 44 for sealing along the counterbore surface. Opposite the side of the adapter ring which abuts against the shoulder 43 or 43a is an inclined face to more or less coact with the inclined face of the innermost seal 39. On the outside of the outermost seal 39 an adapter ring 45 is threadedly received within the counterbore 37 to bear against the seals 39 and hold them in place. Both adapter rings 42 and 45 are sized to provide clearance at their inner peripheries with the outer surface of the liquid conveying tubular member 34 to allow on one side the pressure of the fuel or liquid to communicate with the inner ends of the seals 39, and on the other side the air or gas from the chamber 31 through a plurality of annularly arranged passageways 46 to communicate with the opposite sides of the inner ends of the seals 39. The air or gas from the chamber 31 of the spraybar housing 28 is also allowed to fill a radial gap between the end of the spraybar housing 28 and the bearing support 33 so that it communicates with the inner end of the combination bearing and seal 38. Therefore, it is seen that the pressure of the fuel or liquid acts against one side of the seals 39 while the pressure of the air or gas being fed to the spraybar 19 acts against the other side; and in this arrangement, the seals 39 see only the differential pressure between the gas and the liquid rather than the pressure of the liquid itself. Inasmuch as the pressure of the gas or the air is always higher than that of the liquid or fuel, this pressure will aid in urging the "Reed" seals 39 to intimately engage at their inner peripheries the outer surface of the liquid conveying tubular member 34 and to intimately engage at their outer peripheries the counterbore surface 37. Obviously, some gas leakage to the liquid or fuel may take place, but this will be negligible and of no consequence.

From the foregoing, it is seen that the present invention provides a rotating seal for rotatable parts, wherein the seal is subjected to pressurized gas on one side and a pressurized liquid of lower pressure on the other side which insures that there is absolutely no liquid leakage beyond the seal.

It will be understood that modifications and variations may be effected without departing from the scope of the novel concepts of the present invention, but it is understood that this application is to be limited only by the scope of the appended claims.

I claim as my invention:

1. A seal for use between parts for preventing leakage of fluid under pressure at high temperatures which comprises a stack of spring washers of equal size having inner aligned peripheries engaging one part and outer aligned peripheries engaging the the other part, said inner and outer peripheries being axially offset from one another but having a spring characteristic inherently tending to come into alignment, means holding one periphery of said washers in position, means allowing the washer on one side of the stack to communicate with a first fluid under pressure, and means allowing the washer on the other side of the stack to communicate with a second fluid of higher pressure than the ambient atmospheric pressure or the pressure of said first fluid so that only the differential in pressure between said fluids acts to influence the engagement between the other periphery of the washers and the part engaged thereby.

2. A seal for use between parts for preventing leakage of liquid under pressure at high temperatures which comprises a stack of flexible spring washers of equal size having inner aligned peripheries engaging one part and outer aligned peripheries engaging the other part, said inner and outer peripheries being axially offset from one another but having a spring characteristic inherently tending to come into alignment, means for holding one periphery of said washers in position, means for allowing the washer on one side of the stack to communicate with a liquid under pressure, and means allowing the washer on the other side of the stack to communicate with a gas of higher pressure than the ambient atmospheric pressure or the liquid pressure so that only the differential in pressure between the gas and the liquid acts to influence the engagement thereby.

3. A seal for use between parts for preventing leakage of fluid under high pressure at high temperatures which comprises a plurality of flexible spring washers of generally conical configuration having one periphery intimately engaging a part and the other periphery intimately engaging another part, a pair of adapter rings engaging opposite sides of said washers at said one periphery and holding the washers in place from both sides at the periphery so that the other periphery is free to have axial movement, means holding said adapter rings in a fixed axially spaced position, a passage on one side of said washers for communicating with a first fluid under pressure, and a passage on the other side of said washers for communicating with a second fluid of higher pressure than the pressure of said first fluid, said one side of said washers facing toward the part engaged by said other periphery of the washers so that the pressure differential between said first and second fluids urges said other periphery toward the part it engages.

References Cited in the file of this patent

UNITED STATES PATENTS

| | | |
|---|---|---|
| 574,353 | Garlock | Dec. 29, 1896 |
| 580,049 | Heim et al. | Apr. 6, 1897 |
| 676,719 | Kitchen | June 18, 1901 |
| 1,200,966 | Minning | Oct. 10, 1916 |
| 1,921,136 | Santiago | Aug. 18, 1933 |
| 2,056,687 | Mosely | Oct. 6, 1936 |
| 2,444,380 | Shimek | June 29, 1948 |
| 2,536,292 | Kollsman | Jan. 2, 1951 |
| 2,579,043 | Kallal | Dec. 18, 1951 |
| 2,690,648 | Pearce et al. | Oct. 5, 1954 |
| 2,771,740 | Johnson | Nov. 27, 1956 |

FOREIGN PATENTS

| | | |
|---|---|---|
| 408,870 | Great Britain | Apr. 19, 1934 |